United States Patent Office 3,780,076
Patented Dec. 18, 1973

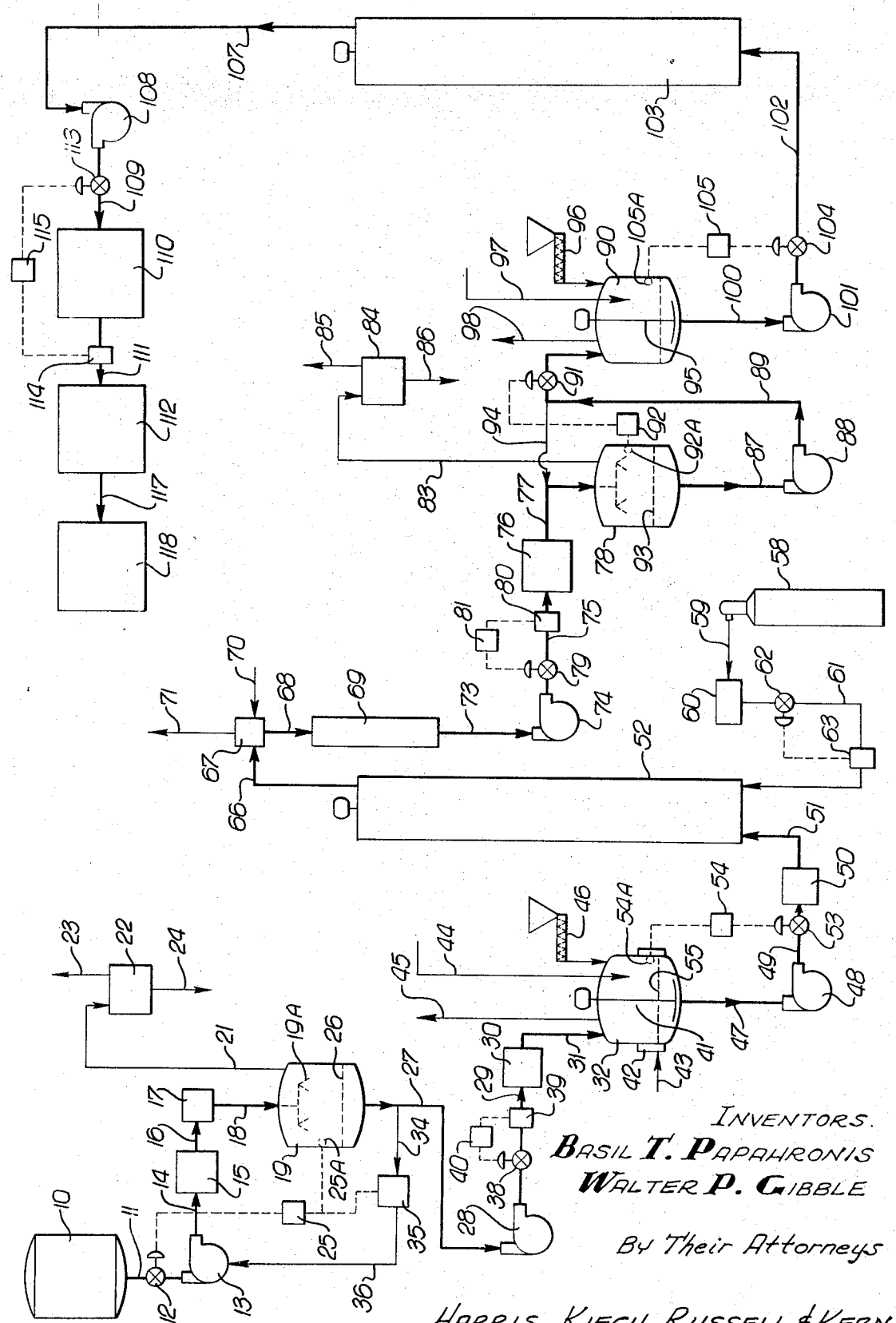

3,780,076
OIL TREATMENT PROCESS
Basil T. Papahronis, Fullerton, and Walter P. Gibble, La Habra, Calif., assignors to Hunt-Wesson Foods, Inc., Fullerton, Calif.
Filed Feb. 18, 1971, Ser. No. 116,456
Int. Cl. C07f 5/10
U.S. Cl. 260—420
17 Claims

ABSTRACT OF THE DISCLOSURE

A continuous method of treating refined unbleached soybean oil to produce a stable frying oil. The method comprises, in the following sequence, preheating the oil, degassing the oil, heating the oil to a higher temperature, adding a copper chromite catalyst to the oil, heating the oil to the catalytic reaction temperature and contacting it with carbon dioxide, degassing and cooling the oil, filtering the oil, and bleaching and deodorizing the oil.

BACKGROUND OF THE INVENTION

The present invention is directed toward a continuous method of treating refined, unbleached soybean oil. In particular the present invention is directed toward a method of improving the odor stability of unhydrogenated or partially hydrogenated refined, unbleached soybean oil for frying purposes.

Soybean oil represents a readily available and relatively inexpensive source of nutritious vegetable oil. However, finished soybean oil processed by normal industrial practice has the characteristic of readily evolving objectionable odors at frying temperatures, that is, temperatures within the range of about 350° to about 400° F. or higher. This odor has been variously described as a beany, grassy, and/or fishy smell. This odor is quite pungent, markedly unpleasant, and very unappetizing. In the case of finished soybean oil (refined, bleached, and deodorized soybean oil), this objectionable odor can occur in a matter of seconds upon heating at or near frying temperature.

Many attempts have been made in the art to eliminate the objectionable frying odor of soybean oil. One solution which is commercially employed is to partially hydrogenate the soybean oil. See "Advances in Research on the Flavor Stability of Edible Soybean Oil" by J. C. Cowan, published in Food Technology, vol. 19, No. 9, pp. 107–146 (1413–1452), 1965. Partial hydrogenation has been quite successful in increasing flavor stability of soybean oil for room temperature use or storage. However, the hydrogenation process must be carefully controlled to prevent the resulting hydrogenated soybean oil from obtaining a lard-like consistency. Further, hydrogenation increases the saturation of the fatty acids in soybean oil. Many experts in the dietary field believe increased saturation causes a decrease in the nutritional value of soybean oil. Furthermore, increased saturation of the oil is believed by many physicians to be undesirable in today's diets. Hydrogenation also increases the price of the finished soybean oil because it produces stearin which must be removed by a conventional winterization process prior to marketing; this decreases the over-all yield of the marketable finished soybean oil.

A second method which is commercially used today for increasing the stability of soybean oil is deodorization (see the above cited J. C. Cowan article). Deodorization, which involves a vacuum steam stripping of the oil, optionally in the presence of citric acid, improves the storage flavor stability of soybean oil. However, this stability is only for a short period of time and has little, if any, effect in increasing the odor stability of soybean oil at frying temperatures.

Another method of increasing the flavor stability of soybean oil is disclosed and claimed in Harvey D. Royce's U.S. Pat. No. 2,349,381, issued May 23, 1944. The method disclosed in this patent comprises heating the soybean oil at a temperature between 240° C. and 300° C. out of contact with air and the presence of finely divided particles of zinc, magnesium, or tin for a period of between 10 and 120 minutes. This method, which has not been commercially successful, increases the flavor stability of soybean oil for room temperature use, such as for salad oil. However, this method has little effect in eliminating the undesirable odors that develop when frying with soybean oil.

SUMMARY OF THE INVENTION

The present invention is directed toward a continuous method of preparing treated finished soybean oil, a soybean oil exhibiting enhanced frying stability. The continuous process comprises preheating refined, unbleached soybean, oil, deaerating the oil, heating the oil to a second temperature, combining the oil with a copper-chromite catalyst, optionally with activated charcoal, heating the oil to a reaction temperature and bringing it in contact with carbon dioxide, degassing and cooling the oil, filtering the oil to remove the catalyst and bleaching and deodorizing the oil.

It is an object of the present invention to provide a continuous process for the production of treated, finished soybean oil from refined, unbleached soybean oil. Specifically it is an object to provide a continuous process which is efficient, employs a minimum of equipment and is relatively self-regulating.

A further object of the present invention is to provide a method of treating refined soybean oil to eliminate objectionable odors at frying temperature. More particularly, it is an object of the present invention to provide a continuous method of treating soybean oil to improve its odor stability under frying conditions without increasing the saturation content of the soybean oil, without decreasing the nutritional value of the soybean oil, and without increasing the stearin content of the soybean oil. A further object of the present invention is to provide a soybean oil that has improved flavor and odor stability for cooking purposes, vegetable oil purposes and for prolonged storage.

DESCRIPTION OF THE DRAWINGS

FIG. 1 is a schematic flow diagram of the continuous process of the present invention.

DESCRIPTION OF THE INVENTION

Referring to FIG. 1, refined (i.e., water washed and dehydrated), unbleached soybean oil, unhydrogenated or partially unhydrogenated (iodine number of 115 maximum), is pumped from the reservoir tank 10 through line 11, feed valve 12, pump 13, line 14, preheater 15, line 16, self-cleaning filter unit 17 and line 18 into a vacuum deaerator 19. The oil is preheated in the preheater 15 to a temperature between about 70° F. and about 135° F., preferably about 130° F. The preheating step is important because it increases the escape tendency of the gases from the oil during deaerating and decreases the solubility of the oil with respect to gases normally present. However, the oil should not be heated to a temperature above 135° F. during the preheating step, otherwise reactions between the oil and oxygen occur which detrimentally affect the flavor of the oil and the success of the treatment. The oil is filtered in unit 17 to remove solids from the oil in order to prevent fouling of the spray nozzles 19A in the deaerator 19. A vacuum of at least one-half atmosphere, preferably a vacuum of less than two inches of mercury, is drawn on the deaerator via line 21 which leads to trap 22. The trap is connected to a vacuum pump (not shown) via line 23. The liquids that are collected in the trap are withdrawn from time to time via line 24 and stored in a waste tank (not shown). A substantial portion of the air is removed from the warm oil during the deaerating step. At least 99% of the atmospheric oxygen is removed from the oil during this step because the presence of oxygen in the subsequent steps has a bad effect on the oil's flavor and the success of the treatment. A liquid level detect 25A is mounted on the side of the reservoir. When the level of the oil 26 reaches a predetermined level, the detector 25A actuates a first flow control system 25 of conventional design which regulates the oil flow from tank 10 to the deaerator by controlling valve 12. When the oil level 26 falls, the system 25 increases the oil flow rate from tank 10 by opening valve 12, and when the oil level rises, the system decreases the oil flow by partially closing valve 12.

The warm, deaerated oil is pumped from the deaerator through line 27, pump 28, line 29, first heater 30 and line 31 into a mixing tank 32. A secondary line 34 leads off of line 27 through an oxygen analyzer 35 and line 36 to pump 13. The first heater can be a conventional process heater such as Dow Therm or Therminol brand exchange type heater. The analyzer continuously measures the $O_2$ level in the warm, deaerated oil and actuates the control system 25 to lower the oil flow rate when the $O_2$ level in the oil exceeds a predetermined level. Optionally, the analyzer can actuate a second control system (not shown) which recycles the oil from line 27 back through pump 13 to have it deaerated a second time. The oxygen analyzer also actuates an alarm system when the $O_2$ level in the oil exceeds a higher, second predetermined level. A feed valve 38 and a fluid velocity meter 39 are part of line 29. The meter 39 actuates a conventional fluid control system 40 which regulates the oil velocity through line 29 via valve 38. The warm, deaerated oil is heated in the heater 30 to a temperature between about 70° F. and about 375° F., preferably between about 130° F. and about 350° F. In operation we have found it satisfactory to heat the oil to about 350° F. The heater can be electrically heated, or heated by steam or super-heated water.

The mixing tank 32 has a motor driven stirrer 41, including a motor, shaft and stirrer blade, and a heating girdle 42 which is heated with steam supplied via line 43. The oil in the mixer tank is maintained at a temperature between 70° F. and 375° F., preferably between about 130° F. and 350° F. Inert gas, preferably carbon dioxide or nitrogen, is used to purge the tank and oil. The gas enters the tank via line 44 from an inert gas source (not shown) and is exhausted out of the tank via line 45. The gas purge removes any residual oxygen from the oil and oxygen liberated by a catalyst mixture which is added to the oil in the tank. A catalyst addition assembly 46 employing an archimedes screw is secured to the top of the tank, and it adds a copper chromite catalyst to the tank at a predetermined rate while the oil is being stirred. The catalyst is added to the oil in amounts of about 0.005 to about 10 percent catalyst by weight of oil, preferably from about 0.01 to about 0.2 percent. The catalyst is preferably in the powdered form, although foraminous, particulated or shaped catalyst granules or pieces can also be employed. The copper chromite containing catalyst is a catalyst that contains substantial portions of copper and chromium salts, such as oxides. The catalyst contains by weight from about 7% to about 65% nonelemental copper and from about 4% to about 41% nonelemental chromium. The catalyst can also contain about 4% to about 14% by weight nonelemental barium, or from about 2% to about 6% by weight of zirconium or from about 0.1% to about 1% palladium. The term "nonelemental copper" means that the copper is not in the free state, but rather is combined with other elements or molecular species such as oxygen or chromate. Likewise, the terms "nonelemental chromium" and "nonelemental barium" mean that the chromium or barium are not in the free state, but rather are combined with other elements or molecular species, such as oxygen or chromate (in the case of barium). The catalyst can be unsupported, or it can be supported upon an inert support such as barium sulfate, neutral alumina, a refractory material, or charcoal. A catalyst containing at least 24% by weight nonelemental copper, at least 20% by weight nonelemental chromium and about 9% by weight nonelemental barium performs very well in the present process. An especially preferred catalyst for the present process is the powdered Girdler G-22 barium promoted copper chromite catalyst sold by the Girdler Catalyst Division of Chemetron Corporation, Louisville, Ky. We have found that the present process works very well employing about 2 pounds of the catalyst for each ton (2000 pounds) of oil. This particular catalyst contains from about 31.5% to 35.5% nonelemental copper, about 25.5% to 29.5% nonelemental chromium, and from about 9.5% to 13.5% nonelemental barium. The surface area of this powdered catalyst is 26.4 m.²/g. Carbon tetrachloride pore volume is 0.13 cc./g. at 800 angstroms and 0.01 cc./g. at 140 angstroms. Mercury pore volume is 1.60 cc./g. at pore diameter range of 45–1 microns, and 0.80 cc./g. at pore diameter range 1.0–0.035 microns. Differential thermal analysis of the catalyst shows (1) static air to 500° C.—very small exotherm at 372° C. and (2) hydrogen at 5,000 space velocity—large exotherm at 158° C., takeoff temperature 125° C. (CuO→Cu). X-ray diffraction of the catalyst shows the following:

| Crystalline compounds: | Mean crystallite size, angstroms |
|---|---|
| CuO | 233 |
| $BaCrO_4$ | 1282 |
| $CuCr_2O_4$ | 86 |
| $Cr_2O_3$ (cubic) | — |

The copper chromite catalysts are apparently made up of crystalline complexes of copper oxide, copper chromate, and chromite. When the catalyst also contains barium or zirconium, the barium is usually complexed to form barium oxide and barium chromate; alternatively, the zirconium is complexed to zirconium oxide and zirconium chromate. The powdered copper chromite catalysts have an apparent bulk density-pack of between 20 lbs./cu. ft. and 80 lbs./cu. ft. with surface areas of between 5 square meters per gram to about 60 square meters per gram. Copper chromite catalysts are commercially available from many sources, such as the Chemetron Corporation or the Harshaw Chemical Company in Cleveland, Ohio.

Optionally, and preferably finely divided or particulated activated charcoal, such as the Nuchar brand activated charcoal, is added together with the catalyst to the oil. The charcoal is added in the ratio of about 0.01% to about 0.2% activated charcoal by weight to gassed oil. Conveniently equal mounts of the copper chromite catalyst and activated charcoal are added to the oil.

The oil-catalyst mixture, which optionally contains activated charcoal, is pumped from the tank 32 through line 47, feed pump 48, line 49, second heater 50 and line 51 into a heated multi-staged contactor 52. A feed valve 53 is connected to line 49, and it is regulated by a third fluid flow control system 54 of conventional design which is actuated by a second level detector 54A positioned in tank 32. When the level 55 of the oil in the tank reaches a predetermined height, the detector actuates system 54 which in turn opens up valve 53 to allow a greater flow of oil out of the tank until such time that the oil level falls below the predetermined level. Optionally the system can also control the addition rate of assembly 46 to insure the oil is mixed with the correct amount of catalyst and activated charcoal. The heater 50 heats the oil-catalyst mixture to a reaction temperature between about 215° F. and 590° F., preferably between 450° F. and 500° F.

The hot oil-catalyst mixture enters the contactor 52 wherein it is brought in contact with carbon dioxide. The carbon dioxide is supplied from reservoir tank 58 through line 59, preheater 60 and line 61 into the contactor. The preheater warms the carbon dioxide gas to a temperature between 70° F. and 590° F. A metering valve 62 and a combination gas flow velocity meter and gas regulatory system 63 are connected to the line 61. The system 63 controls the valve 62 which in turn regulates the carbon dioxide gas flow through line 61. We have found that the addition of 300 cubic feet of carbon dioxide gas (temperature about 100° F.) for every ton of oil works very well in the reaction step, although the amount can be varied and optimized for particular reaction conditions. At the present time we have not ascertained the minimum required amount of carbon dioxide gas for the treatment. However, we believe the treatment can be conducted with a 100 cubic feet of carbon dioxide for each ton of oil.

The multi-stage contactor is of conventional design, such as the Lightnin' brand jacketed multi-stage contactor Model Mark III manufactured by Mixing Equipment Co., Inc., of Rochester, N.Y. The contactor is of sufficient capacity to insure that the oil-catalyst and carbon dioxide are in contact for a sufficient period of time to complete the treatment or reaction. Generally the reaction period is between 10 minutes and 6 hours, although other reaction times can be employed depending upon the reaction temperature, the catalyst and its concentration and carbon dioxide concentration. The preferred reaction time at the preferred reaction temperature is between about 30 minutes and about 1½ hours. We have found that a one-hour reaction or treatment period is satisfactory at a reaction temperature of 480° F., employing a Girdler G–22 barium promoted copper chromite catalyst at a concentration of about .09% and employing 300 cubic feet of carbon dioxide gas per ton of oil. The contactor is heated to maintain the reaction temperature of the oil-catalyst-carbon dioxide mixture during the treatment.

After treatment, the oil-catalyst-carbon dioxide mixture flows through line 66, gas exchanger 67 and line 68 into a cooler 69. The mixture is purged with nitrogen gas via line 70 in the gas exchanger. The exhaust gas which contains nitrogen and carbon dioxide is exhausted through line 71, that leads to a trap (not shown) similar to trap 22. We have found it very beneficial to remove the carbon dioxide from the oil as soon as possible after the treatment or reaction step. For some unknown reason, oil stored under a carbon dioxide atmosphere develops an off-flavor. The oil-catalyst mixture is cooled in the cooler 69 to a temperature of below 350° F., preferably 300° F. or lower. The cooler unit can be a refrigerated unit or a heat exchanger type unit. Optionally, the first or second heater 30 or 50 and the cooler unit can be a combination heat exchanger unit.

The cooled oil-catalyst mixture is pumped from the cooler unit through line 73, pump 74, line 75, filter 76 and line 77 into a vacuum degasser vessel 78. A feed valve 79 and a fluid velocity meter 80 are connected to line 75. The meter 80 actuates a fluid flow control system 81 which in turn controls the feed valve to regulate the fluid flow. When the flow exceeds a predetermined velocity, the valve is partially closed to reduce the oil velocity, and when the flow falls below a predetermined velocity, the valve is partially opened to increase the oil velocity. The control system can be a proportional control system that opens and closes the valve proportionately to the oil velocity to maintain the fluid velocity at a relatively constant rate. The oil-catalyst mixture is filtered in the filter unit 76 to remove all the solids from the oil, i.e., the catalyst and activated charcoal if employed. We have found it to be beneficial to remove the catalyst from the oil as soon as possible after the treatment. The oil-catalyst mixture could be filtered before cooling, but we have found it advantageous to do it after cooling since the viscosity of the oil is lower at lower temperatures. The filtered oil is degassed in the degassing vessel under a vacuum of at least one-half atmosphere, preferably under a vacuum of at least two inches of mercury. This degassing step removes a substantial portion of the residual carbon dioxide from the oil. This degassing step is accomplished as soon as possible after the treatment step. The vacuum is pulled from the degasser vessel via line 83, trap 84 and line 85 which is connected to a vacuum pump (not shown). Liquids that are collected in the trap are periodically drained from the trap via line 86.

The degassed oil is pumped from the degassing vessel 78 through line 87, pump 88 and line 89 into a second mixing vessel 90. A feed valve 91 is connected to line 89, and it is controlled by a fluid flow control system 92 which is actuated by a level detector 92A mounted in vessel 78. When the level of the oil 93 in the degasser vessel reaches a predetermined level, the detector 92A actuates the system which in turn partially opens or closes the valve 91 to increase or decrease the oil flow, respectively, and lower or increase the oil level 93 in the vessel, respectively. An overflow line 94 connects line 89 to line 77, and it has a one-way check valve (not shown) to prevent the filtered oil from by-passing the degassing step.

The mixer vessel or tank 90 is equipped with a motor driven stirrer 95, a reagent addition assembly 96, an inert gas (nitrogen gas) purge line 97 and a gas exhaust line 98 as the mixer tank 32 is similarly equipped. The assembly 96 adds bleaching clay to the tank at a constant rate such that between 20 and 60 pounds, preferably about 40 pounds, of bleaching clay are added per each ton of oil. The oil is continuously stirred in the tank to insure maximum contact between the oil and clay. Optionally the assembly 96 is proportionately controlled by system 92 to provide that the clay concentration in the oil remains relatively constant. The temperature of the oil in the tank is between 200° F. and 250° F., preferably 250° F. This temperature is achieved by controlling the temperature of the oil exiting from the cooler 69 and compensating for the heat loss occurring between the cooler and the vessel 90.

The oil-clay mixture is pumped from the mixer vessel 90 through line 100, pump 101 and line 102 into a motor-driven, jacketed, multi-stage contactor 103 similar in design to the contactor 52 described above. A feed valve 104 is connected to line 102, and it is regulated by a control system 105 is actuated by the level detector 105A. The operation of this detector-system-valve assembly is similar to the operation of the detector 92A-system 92-valve 91 assembly described above. The oil-clay mixture is maintained at a temperature between 200° F. and 250° F., preferably 250° F., for a period between about 5 minutes and about 2 hours, preferably about 1 hour, in the contactor 103 to complete the bleaching step. However other reaction periods and reaction times can be employed in the bleaching step.

After the bleaching step, the oil-clay mixture is pumped out of the contactor 103, through line 107, pump 108, line 109, filter unit 110 and line 111 into a steam deodorizer 112 of conventional design. A feed valve 113 is connected to line 109, and a fluid flow velocity meter 114 is connected to line 111. The meter 114 actuates a fluid flow control system 115 which regulates the valve 113. The operation of this meter-system-valve assembly is similar to the operation of the meter 80-system 81-valve 79 assembly described above. The oil-clay mixture is filtered in the filter unit 110 to remove the clay and other solid particles from the oil to give treated, bleached soybean oil. The deodorizer is of conventional design and is schematically illustrated as box 112. The oil is deodorized, at a pressure of between 1 and 10 mm. of mercury, at a temperature of about 450° F. employing steam and optionally including citric acid (about 33 p.p.m. of oil). The deodorization takes from about 1 to about 3 hours, although other reaction times can be used in practice. After the deodorization, the treated finished oil is cooled in a cooling unit (heat exchanger type) and passed through line 117 to packaging which is schematically illustrated as box 118.

Two of the reasons the oil is not heated to a reaction temperature prior to the addition of the catalyst mixture are: (1) minimize the period of time at which the oil is maintained at the high reaction temperatures and (2) to minimize oxidation of the oil when the catalyst mixture is added thereto. The catalyst and charcoal adsorb and absorb large volumes of gases including oxygen. When the catalyst and charcoal are added to the hot oil they degas. Since the severity of oxidation increases with temperature, relatively low temperatures are favored at the catalyst mixture addition step. However, the degassing rate of the catalyst mixture is temperature dependent and at a relatively low temperature, such as 135° F., the degassing requires a substantial period of time which can create a hang-up in the continuous process. For this reason the oil is preferably heated to an intermediate temperature between about 130° F. and 350° F. prior to the addition and mixing of the catalyst mixture to speed up the degassing of the catalyst mixture.

If the catalyst mixture is deaerated prior to its addition to the oil, the oxidation problem can be eliminated. The catalyst mixture is deaerated by heating to a high tempertaure, such as about 560° F., preferably under vacuum. The deaerated catalyst mixture can be stored under vacuum or more conveniently under nitrogen, helium, argon or carbon dioxide. When employing a deaerated catalyst mixture, the deaerated oil can be heated to a reaction temperature, that is, a temperature between 215° F. and 590° F., at heater 30 and the subsequent heating at heater 50 could be eliminated. Alternatively the degassed oil could be pumped directly to the mixer 32 without heating, and after the addition and mixing of the deaerated catalyst mixture heated to a reaction temperature at heater 50 prior to the entry of the oil-catalyst mixture into the contactor 52.

In an alternative embodiment of the invention (not shown) some or all of the control systems 25, 40, 54, 63, 81, 92, 105 and 115 can be under a master control system (not shown) which can be actuated by any one of the detectors or meters 25A, 35, 39, 54A, 63, 80, 92A, 104 and 113 and override all of the listed control systems and control the addition assemblies 46 and 96 to insure that each step is carried out properly, i.e., deaerating to remove a substantial portion of the oxygen from the oil, adding the correct amounts of catalyst, activated charcoal, carbon dioxide and bleaching clay and degassing the oil to remove the residual carbon dioxide from the oil. Moreover other control devices can be employed in the invention, other than those described. For example, metering pumps can be employed and reservoir tanks can be placed in the system.

During the present process the oil must be substantially free of oxygen from deaerating step in the deaerating vessel 19 all the way through to the deodorization step at box 112. Preferably the treated finished oil is packaged or stored under an inert gas such as nitrogen gas, helium gas or argon gas.

What we claim is:

1. A method of improving the odor and flavor stability at a frying temperature of about 350° F. to 400° F. of unhydrogenated or partially hydrogenated refined, unbleached soybean oil without increasing the saturation or stearin content of the soybean oil which comprises the following steps in continuous sequence:

heating refined, unbleached soybean oil at a first stage to a temperature between about 70° and 135° F.;
deaerating the heated oil under a vacuum at a second stage to remove a substantial portion of the oxygen gas from the oil;
heating the deaerated oil at a third stage to a temperature between about 70° and 375° F.;
mixing the heated oil with a predetermined amount of a catalyst mixture consisting essentially of copper chromite catalyst at a fourth stage;
heating the oil-catalyst mixture at a fifth stage to a temperature between about 215° and 590° F.;
contacting the heated oil-catalyst mixture with carbon dioxide at a sixth stage for a predetermined length of time to treat and stabilize said oil, said preceding mixing, heating and contacting steps at said fourth, fifth and sixth stages being conducted in an environment substantially free of oxygen;
filtering the oil-catalyst mixture at a seventh stage to remove the catalyst mixture therefrom to give treated unbleached oil; and
degassing the filtered oil under a vacuum at an eighth stage to remove a substantial portion of the carbon dioxide from the oil.

2. The continuous method as defined in claim 1 including the step of cooling the treated oil-catalyst mixture at a stage between the sixth and seventh stages to a temperature between 70° and 300° F.

3. The method as defined in claim 2 including the following steps:

mixing the degassed treated refined unbleached soybean oil under a nitrogen gas atmosphere with a predetermined amount of bleaching clay at a ninth stage for a predetermined length of time at a temperature between 200° and 250° F. following the degassing step; and
filtering the oil-clay mixture at a tenth stage to remove the clay therefrom to obtain treated bleached soybean oil.

4. The process as defined in claim 3 including the following steps:

steam deodorizing the treated refined bleached soybean oil under vacuum with deodorizing means at an eleventh stage to obtain finished treated soybean oil.

5. The method according to claim 1 wherein the oil is preheated to 130° F. at the first stage; heated to a temperature between 130° F. and 350° F. at the third stage; and heated to a temperature between 480° F. and 540° F. at the fifth stage.

6. The method as defined in claim 1 wherein the temperature of the heated oil is maintained at a temperature between about 130° and 350° F. at the fourth stage wherein the heated oil is mixed with a predetermined amount of the catalyst mixture.

7. The continuous method as defined in claim 1 wherein the temperature of the heated oil-catalyst mixture is maintained at a temperature between about 480° and 540° F. at the sixth stage and the oil-catalyst mixture is contacted with carbon dioxide for a period between about 10 minutes and 2½ hours.

8. The continuous process as described in claim 1 wherein each ton of the heated oil is mixed with between about .2 and 4 pounds of a copper chromite catalyst in the catalyst mixture at the fourth stage.

9. The method as defined in claim 8 wherein the catalyst mixture contains activated charcoal.

10. The process according to claim 9 wherein each ton of the heated oil is mixed with about .2 to about 4 pounds of activated charcoal in the catalyst mixture at the fourth stage.

11. The process according to claim 1 wherein the oil-catalyst mixture is brought in contact with the carbon dioxide at a temperature of about 480° F. for a period of about one hour at the sixth stage.

12. The process according to claim 11 wherein each ton of the oil-catalyst mixture is brought in contact with about 300 cubic feet of carbon dioxide gas at the sixth stage.

13. The process according to claim 8 wherein the copper chromite catalyst contains, by weight, about 7% to about 65% nonelemental copper and about 4% to about 41% nonelemental chromium.

14. The method according to claim 13 wherein the copper chromite catalyst is powdered G-22 Girdler brand barium promoted copper chromite catalyst.

15. A continuous method of improving the flavor and odor stability at frying temperature of unhydrogenated, refined unbleached soybean oil without increasing the saturation of the soybean oil which comprises the following steps:

heating the refined, unbleached, unhydrogenated soybean oil at a first stage to a temperature at about 130° F.;

deaerating the heated oil under a vacuum at a second stage to remove substantially all of the oxygen from the oil;

heating the oil at a third stage to a temperature of about 350° F. in an environment substantially free of oxygen;

mixing the heated oil in an environment substantially free of oxygen with a predetermined amount of a catalyst mixture consisting essentially of copper chromite catalyst and activated charcoal at a fourth stage such that each ton of heated oil is mixed with about 2 pounds of catalyst and about 2 pounds of activated charcoal, the temperature of the heated oil being maintained at a temperature of about 350° F. during the mixing;

heating the oil-catalyst mixture at a fifth stage to a temperature of about 480° F. in an environment substantially free of oxygen;

contacting the heated oil-catalyst mixture in an environment substantially free of oxygen at a sixth stage with carbon dioxide for about one hour while maintaining the temperature of the oil-catalyst mixture at about 480° F. to prepare treated refined unbleached soybean oil;

cooling the oil-catalyst mixture at a seventh stage to a temperature between 250° and 300° F. in an environment substantially free of oxygen;

filtering the cooled oil-catalyst mixture at an eighth stage to remove the catalyst mixture therefrom in an environment substantially free of oxygen;

degassing the filtered oil at a ninth stage under vacuum to remove substantially all of the carbon dioxide from the oil;

mixing the degassed oil under nitrogen gas with a predetermined amount of bleaching clay for a predetermined length of time at a temperature of about 250° F. at a tenth stage;

filtering the oil-clay mixture at an eleventh stage to obtain processed, treated, bleached soybean oil; and deodorizing the processed, treated, bleached soybean oil at a twelfth stage with deodorization means to produce treated, finished unhydrogenated soybean oil having said odor and flavor stability at frying temperature.

16. The method according to claim 15 wherein the copper chromite catalyst is powdered G-22 Girdler brand barium promoted copper chromite catalyst.

17. The method according to claim 16 wherein each ton of the oil-catalyst mixture is brought in contact with about 300 cubic feet of carbon dioxide at the sixth stage.

References Cited
UNITED STATES PATENTS

| | | | |
|---|---|---|---|
| 3,271,410 | 9/1966 | Cagneron et al. | 260—419 X |
| 2,292,027 | 8/1942 | Glenn | 260—428 X |
| 2,275,660 | 3/1942 | Steinle et al. | 260—428 X |
| 2,508,919 | 5/1950 | Jakobsen | 260—428 |
| 2,674,609 | 4/1954 | Beal et al. | 260—428 |

LEWIS GOTTS, Primary Examiner

E. G. LOVE, Assistant Examiner

U.S. Cl. X.R.

99—118 R